(12) United States Patent
Miller, III et al.

(10) Patent No.: US 6,238,003 B1
(45) Date of Patent: May 29, 2001

(54) OUTBOARD SILL PRETENSIONER

(75) Inventors: H. John Miller, III, Macomb Township, Macomb County; Jon E. Burrow, Clawson; Lynette M. Norgan-Curtiss, Novi, all of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/170,387

(22) Filed: Oct. 13, 1998

(51) Int. Cl.[7] ................................................ A47C 31/00
(52) U.S. Cl. ................................................ 297/480
(58) Field of Search .................................. 297/480, 483, 297/464, 468, 479; 280/806

(56) References Cited

U.S. PATENT DOCUMENTS 3,871,470 * 3/1975 Schwanz et al. .
3,901,531 * 8/1975 Prochazka .
5,207,618 * 5/1993 Nishizawa .
5,607,185 * 3/1997 Isaji et al. .

* cited by examiner

Primary Examiner—Milton Nelson, Jr.
(74) Attorney, Agent, or Firm—Markell Seitzman

(57) ABSTRACT

A multi-point seat belt system (20') for protecting an occupant seated upon a vehicle seat, the system comprising: a shoulder belt (42) and a lap belt (44) securable, with some amount of slack, about the occupant, a seat belt buckle (48) attached to one end of the lap belt (44) at an inboard location and a belt tightener secured to an opposite end (44b) of the lap belt for eliminating any slack in the lap belt, the belt tightener located at an outboard location.

9 Claims, 6 Drawing Sheets

OUTBOARD SILL PRETENSIONER

BACKGROUND AND SUMMARY OF THE INVENTION

The invention generally relates to a seat belt pretensioning device and more particularly to a pretensioner associated with the non-buckle anchor point of the seat belt system.

A seat belt pretensioner or belt tightener, as it is also referred to in the art, is used to reduce the amount of slack in a seat belt system in relationship to the seated occupant (about whom the seat belt system is placed). one type of pretensioner or belt tightener is associated with a seat belt retractor. In this device or system the spool of the retractor is caused to rewind, thereby eliminating the slack about the occupant. In a three-point seat belt system the retractor, in its pretensioning mode of operation, tightens the shoulder belt which in turn pulls upon and tightens the lap belt which is often permitted to slip through an opening on a tongue. Another type of pretensioning system utilizes a pretensioner or belt tightener that is connected directly to the seat belt buckle. With the seat belt installed about the occupant, a tongue is inserted and latched within the buckle. It is the tongue that separates the shoulder belt portion and the lap belt portion of the seat belt. On activation, the pretensioner pulls the buckle, and hence the tongue, downwardly thereby tightening the lap belt and shoulder belt respectively about the lower and upper torso of the occupant.

Reference is briefly made to FIG. 1 which illustrates a conventional three-point safety belt system 20 as might be utilized in conjunction with the rear bench seat of an automobile. The same or similar system is utilized with each of the front bucket or bench seats in a vehicle. The three-point system 20 comprises a seat belt retractor 22 which may be mounted upon the rear shelf 24 of the vehicle. The retractor may be mounted within the back 30 of the seat 32. The location of the retractor is denoted by numeral 22'. The seat would also include a slot 34 through which the seat belt exits. The retractor can also be mounted behind the side trim of the passenger compartment. The seat belt system 20 includes a seat belt or safety belt 40 which is divided into a shoulder belt portion 42 and a lap belt portion 44. The demarcation between the shoulder belt and lap belt is defined by a tongue 46 that is inserted and locked within a seat belt buckle 48. The lap belt portion 44 (and shoulder belt portion) may be permanently secured to the tongue 46 or the seat belt 40 can be slidingly received through a slot on the tongue. A pretensioning device 50, such as shown in U.S. Pat. No. 5,667,246 and incorporated herein by reference, is secured between an anchor point 52 and the buckle 46. Characteristic of buckle pretensioners, the pretensioner 50 includes a hollow tube having a movable piston therein. The piston is secured to one end of a wire cable. The other end of the cable is secured to the seat belt buckle, or alternatively, to a short length of seat belt material. The pretensioner 50 includes a quantity of pyrotechnic material which, when activated, generates products of combustion causing the piston to move down the tube carrying with it the cable. This repositioning of the piston moves the seat belt buckle downwardly, thereby eliminating a degree of slack in the lap belt portion and the shoulder belt portion in relationship to the seated occupant (not shown).

As is known in the art, the use of a buckle pretensioner moves the buckle with a significant force and resulting acceleration and velocity. The operation of the seat belt buckle might cause a conventional buckle to open. As a consequence, blocking or balancing buckles (also referred to as "anti-g buckles") are utilized in the buckle pretensioning, high deceleration environment to prevent the latching element of the buckle from opening.

Again with reference to FIG. 1, the end 44b of the lap belt portion 44 remote from the buckle 48 is secured to a structural element such as the vehicle floor 31 (or to seat frame 30a) by an anchor 58, typically comprising a metal bracket sewn to the lap belt 44 and having an opening therein. The bracket is secured to a structural element using a threaded fastener or the like.

It is an object of the present invention to provide a belt tightening device secured to the non-buckle end of a lap belt.

Accordingly the invention comprises: a multi-point seat belt system for protecting an occupant seated upon a vehicle seat, the system comprising: a lap belt securable about the occupant with some amount of slack, a seat belt buckle attached to one end of the lap belt at an inboard location in the vehicle and pretensioning means secured to an opposite end of the lap belt for eliminating any slack in the lap belt about the occupant, the pretensioning means located at an outboard vehicle location.

Many other objects and purposes of the invention will be clear from the following detailed description of the drawings.

DETAILED DESCRIPTION OF THE DRAWINGS

Figure 1:
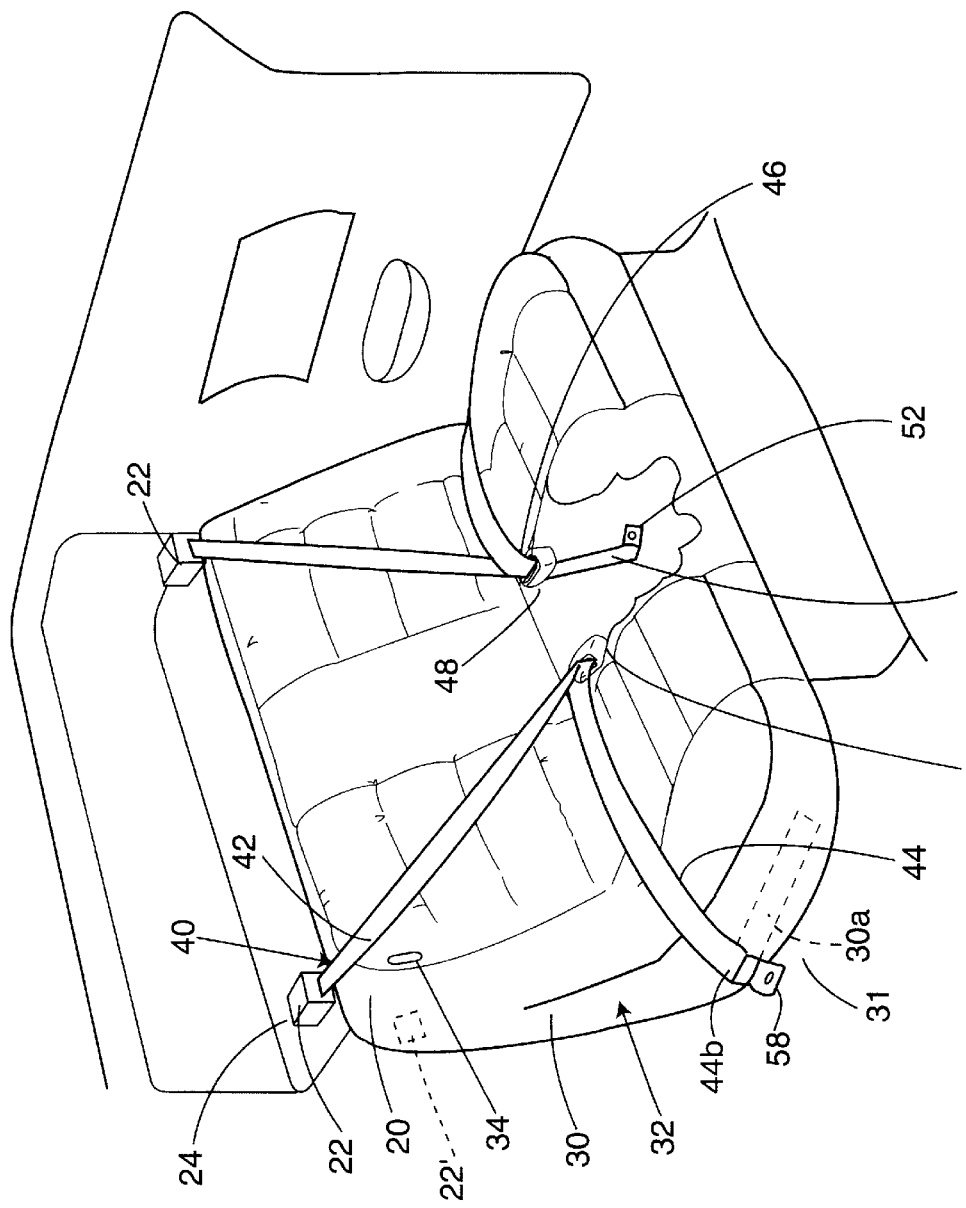
FIG. 1 diagrammatically illustrates a prior art rear three-point seat belt system.
Figure 2:
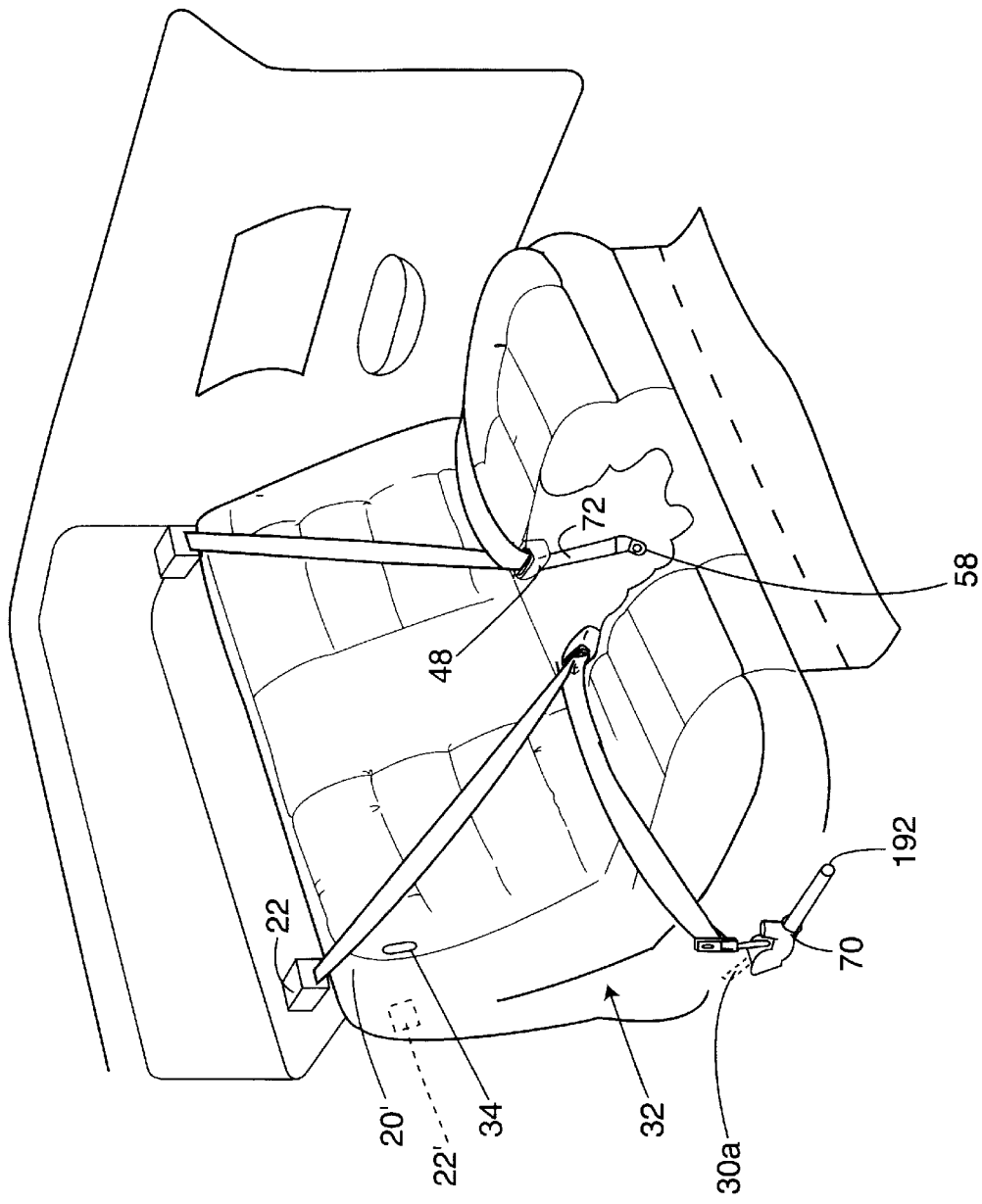
FIG. 2 illustrates a rear three-point seat belt system utilizing the present invention.

Reference is made to FIG. 2 which illustrates the rear of a typical automotive passenger compartment having two seats 32 and seat belt system 20' utilizing the present invention used with each seat 32. In the present invention, the anchor 58 (of FIG. 1) that was previously secured to end 44b of the lap belt 44 has been replaced by an outboard mounted pretensioner 70 secured to the seat frame 30a (or alternatively to the floor 31). The seat belt buckle 48 is now connected to a structural member via a conventional anchor 58 utilizing a short length of seat belt material 72.

Figure 3:
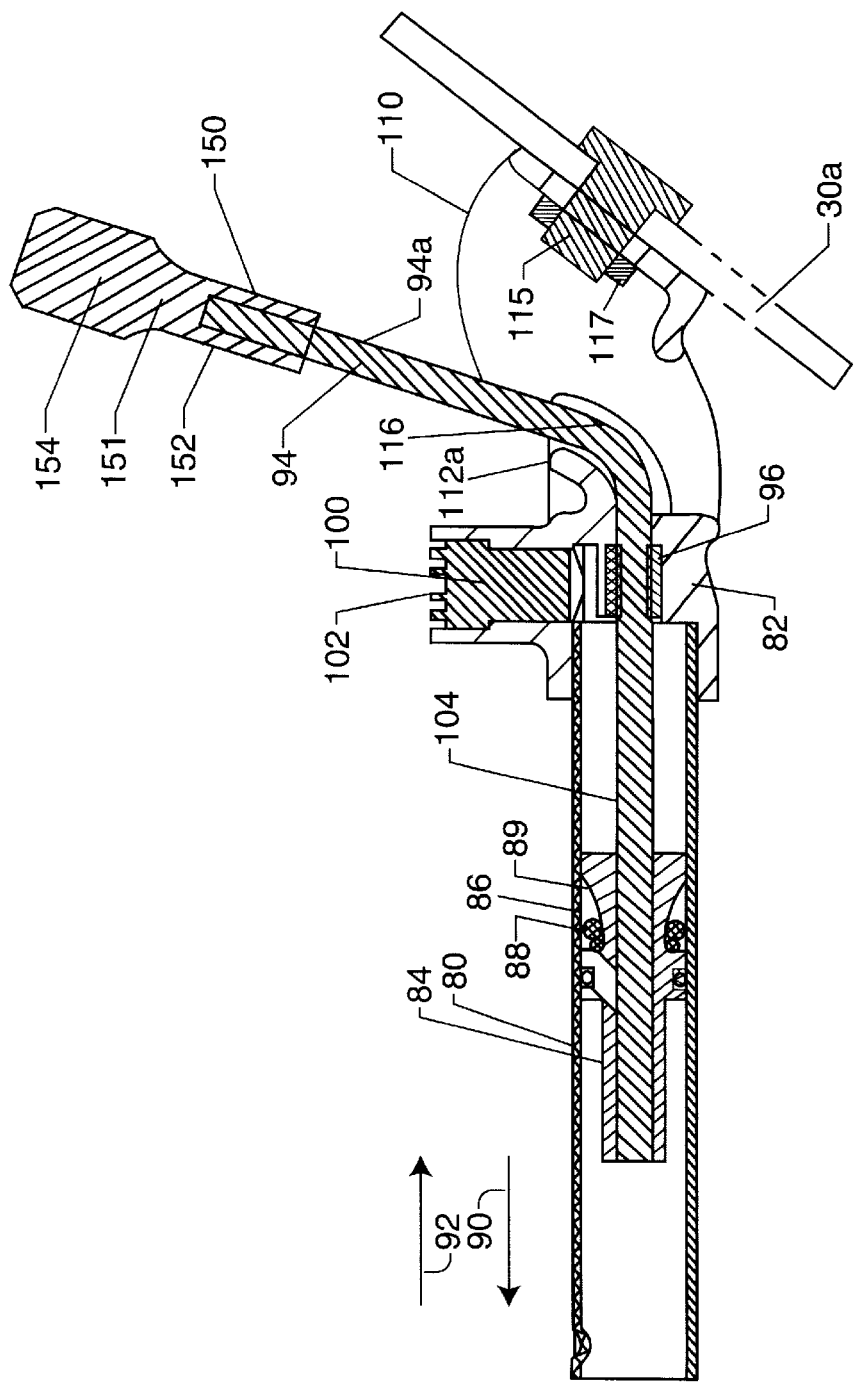
FIG. 3 illustrates an outboard mounted, lap pretensioner or belt tightener.
Figure 3A:
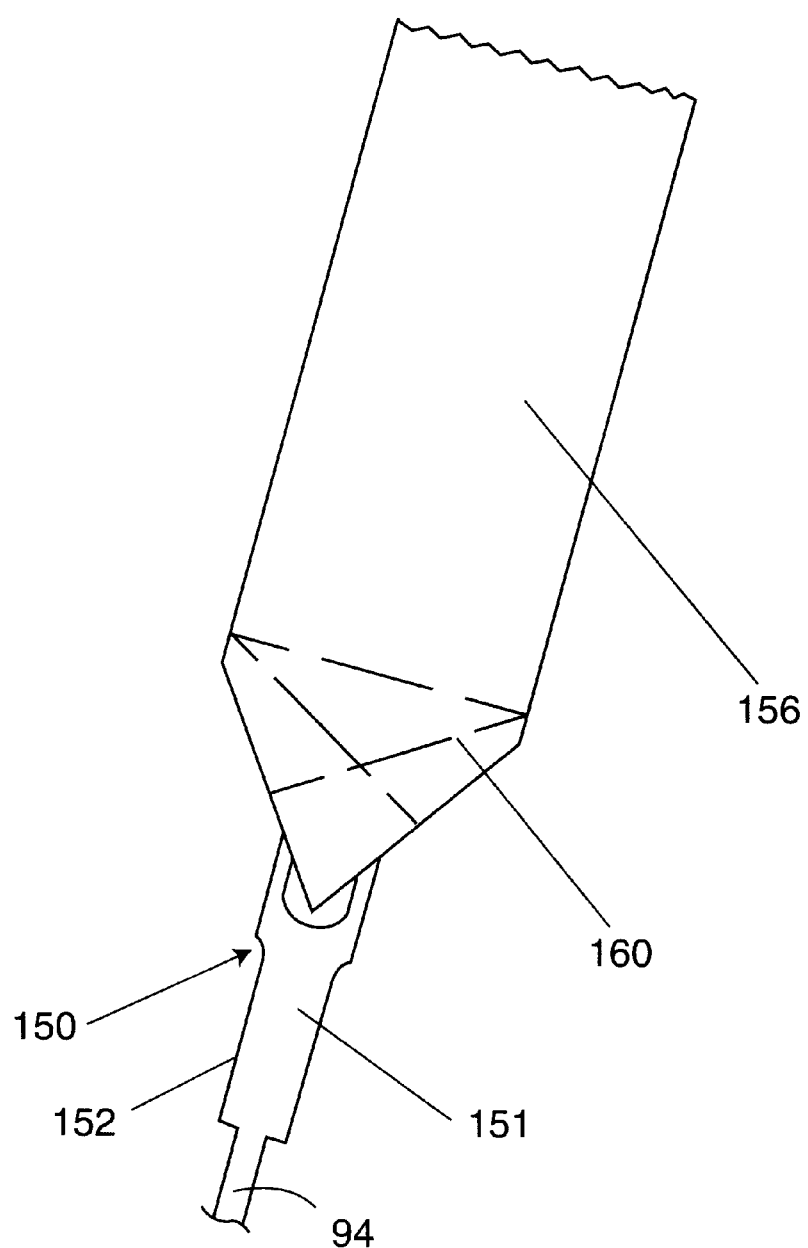
FIG. 3a shows a cable termination and seat belt.
Figure 4:
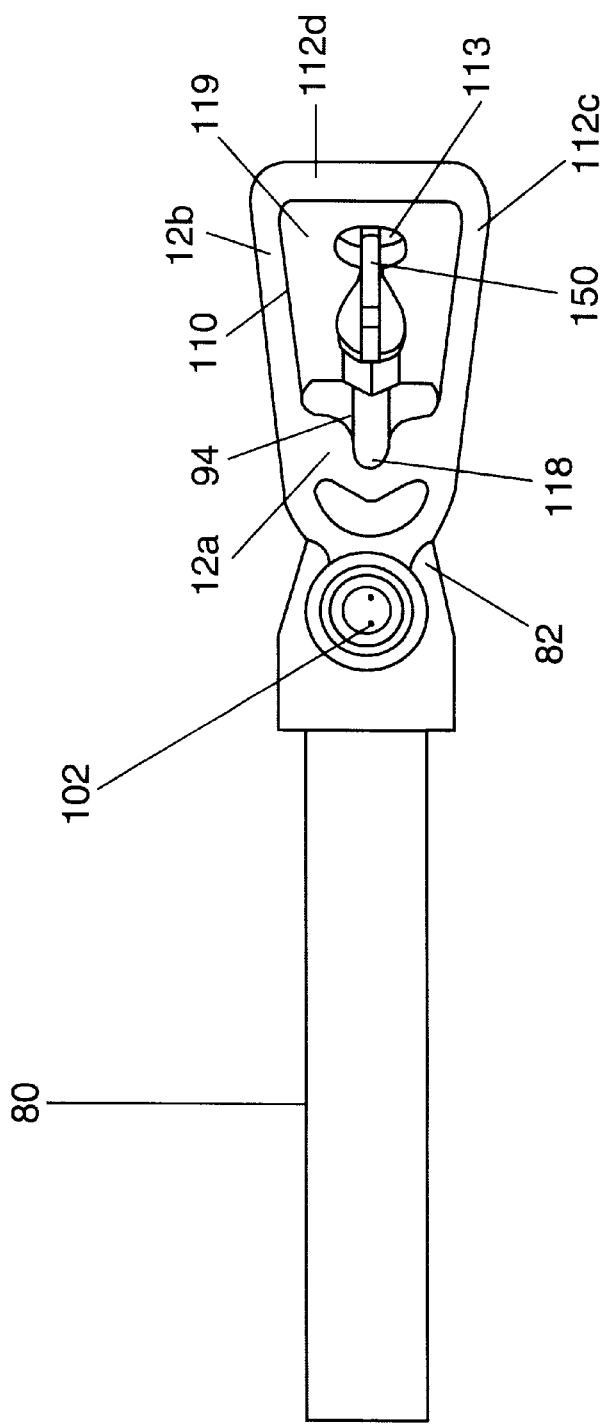
FIG. 4 is a top view of the pretensioner of FIG. 3.

FIGS. 3 and 4 illustrate, in greater detail, the seat belt pretensioner 70. The pretensioner 70 comprises a tube 80 secured to a propellant housing 82. A moveable piston 84 is slidably received within the tube. The piston 84, of the tube, may include locking features 86 including a known arrangement of a plurality of metal balls 88 captured within a ramped groove 89. This locking feature operates as a one-way clutch permitting the piston to move in a belt tightening direction 90 but prohibiting movement in a belt loosening direction 92. Secured to the piston 84 is the above-mentioned cable 94 which exits through passage 96 in the housing 82. Positioned upon or within the housing 82 is a squib or quantity of propellant generally shown as 100 having an electrical connector 102 (or alternatively separate wires or a wiring harness) for receipt of an electrical control signal to activate the pretensioner during a vehicle crash or rollover event. Upon activation of the squib 100, products of combustion are produced within a combustion chamber 104 causing the piston 84 to rapidly move down the tube (in the direction 90 of belt tightening). Secured to the propellant housing 82 is a mounting bracket 110. In the preferred embodiment the housing 82 and the bracket 110 are of integral construction. However, they can be separate and connected by fasteners. The bracket is hollow and includes a stem 112a (attached to the housing 82) and associated side walls 112b and c and end wall 112d. End wall 112d includes an opening 113 through which a fastener 115, such as a threaded bolt, is received and which extends from the support structure such as the seat frame 30a or vehicle floor (see FIG. 3). As can be seen from FIG. 4, the bracket walls form an open cavity 119 through which the cable 94 extends. The stem portion 112a of the bracket 110 includes an integral, stationary pulley sector 116 about which the cable 94 bends prior to exiting the bracket 110. As shown the pulley sector 116 is formed as a tube or snorkel. The pulley sector 116 can also be made as an open-faced structure rather than the tube and can be a separate pulley wheel that is fixedly or rotationally secured to the bracket 110. The bracket 110 also includes, situated above the pulley sector 116, a circular groove 118 which aligns the cable 94 within the bracket 110. An end 94a of the cable 94 is connected to a cable termination 150 as shown in FIG. 3a or an alternate cable termination 150a as illustrated in FIG. 4.

Reference is briefly made to FIG. 3a. More particularly, the cable termination includes a lower end 152 that is swaged upon end 94a of the cable. The termination 150 includes a body 151 having an opening 154 through which a reduced diameter (folded-over) portion 156 of the lap belt 44 is slid through and then folded over and sewn upon itself. The lines of stitches are shown by numeral 160.

Figure 5:
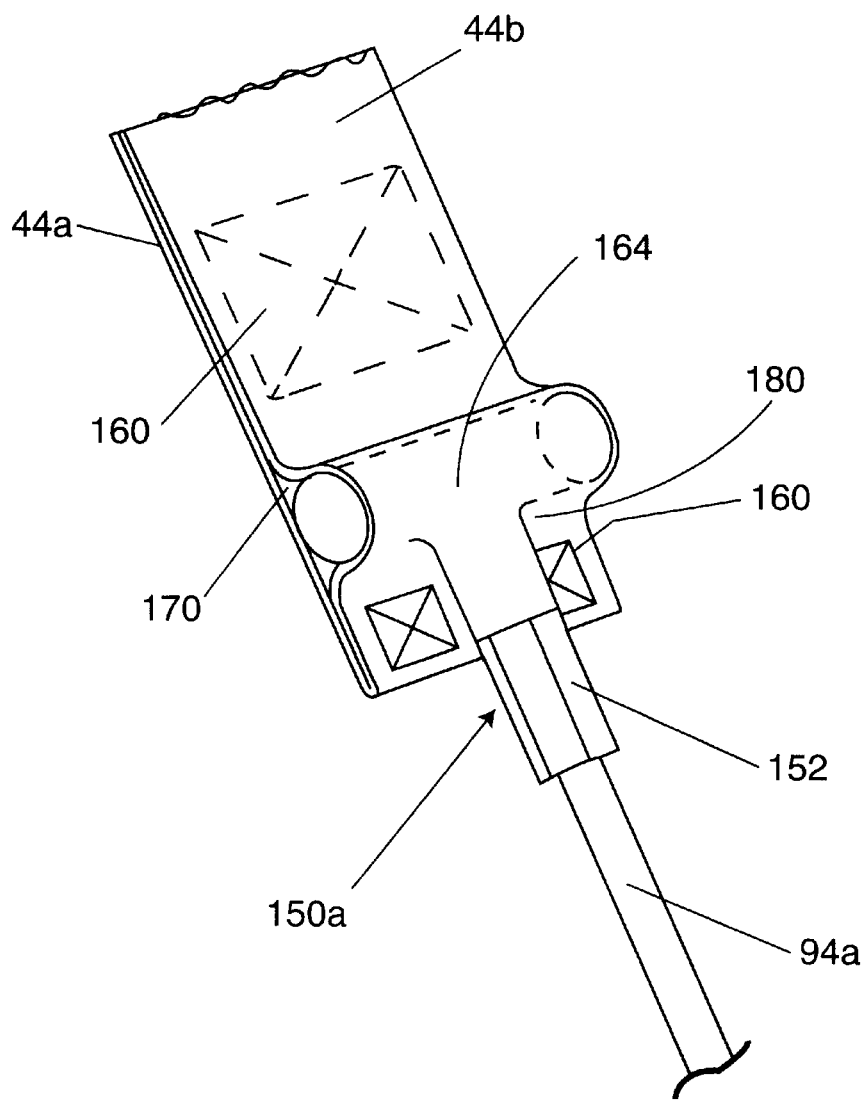
FIG. 5 shows an alternate cable termination.

Reference is again briefly made to FIG. 5 which shows an alternate termination 150a. The termination 150a includes a lower portion 152 swaged upon the cable end 94a and an extending T-shaped connecting end 164. The termination 150a is fitted within a pocket 170 formed by two mating pieces or layers of the lap belt. These mating pieces or layers of the lap belt portion are shown by numerals 44a and 44b. Prior to installation of the termination 150a upon the cable end 94a, the end 94a is inserted within the opening 180 (at the fold line between two layers 44a and 44b of the seat belt). Thereafter, the layers 44a and 44b of the lap portion 44 are folded about the termination 150a and sewn together, see sew lines 160, securing the cable termination 150a.

One of the benefits of utilizing an outboard located pretensioner is to lessen the occurrence of the occupant submarining (sliding under the lap belt portion) in comparison with systems utilizing the conventional inboard buckle pretensioner (as shown in FIG. 1). The occurrence of submarining can be reduced if the buckle (and/or the lap belt) is prevented from riding up or being drawn up onto the hip of the occupant. With retractor pretensioners and buckle mounted pretensioning devices the buckle (and lap belt) are urged slightly upward or the buckle is rotated rearward upon activation of these devices to reduce slack. Both of these actions tend to lift the lap belt relative to the occupant's hip.

In the present invention submarining is lessened since, by pulling on the end 44b of the lap belt opposite the buckle, the lap belt is not lifted relative to the ilial spine (hip bone). Another benefit of the present invention is that the outboard pretensioner, in combination with the lap belt, pulls only directly upon the lap belt which is more likely to be rooted properly about the lower torso of the occupant. Further, since the pretensioner is secured to an extending end portion of the lap belt, the system 22' does not require the use of a specialized anti-g buckle typically used with inboard buckle pretensioners. Finally, the system 20' utilizing the outboard mounted pretensioner is especially effective in rear vehicle seat applications. The packaging space that is typically made available for safety products for rear seat application is limited. There is typically no extra room to mount a retractor with its pretensioner which often includes an extending tube. Further, as the buckle is often routed through the rear bench seat, it is difficult to also mount a buckle pretensioner for rear seat application. An inspection of many rear seat installations will show that there always seems to be at least a small amount of space on a ledge or sill on or near the outboard side of the rear seat to mount an outboard sill pretensioner of the present invention.

Many changes and modifications in the above described embodiment of the invention can, of course, be carried out without departing from the scope thereof. Accordingly, that scope is intended to be limited only by the scope of the appended claims.

What is claimed is:

1. A multi-point seat belt system (20') for use within a vehicle for protecting an occupant seated upon a vehicle seat, the system comprising: a lap belt (44) securable about the occupant with a determinable amount of slack, a seat belt buckle (48) operatively attachable to the lap belt (44) at an inboard location within the vehicle and pretensioning means secured to an end (44b) of the lap belt for eliminating slack in the lap belt;

wherein the pretensioning means includes
    a tube,
    a piston movable within the tube, the piston and tube cooperating to provide a one-way clutch means for permitting movement of the piston in a belt tightening direction and restricting movement in an opposite direction,
    a pyrotechnic element, which when activated produces products of combustion to propel the piston down the tube,
    a cable connected to the piston and to the lap belt for pulling the lap belt tight,
    a bracket (110) including an end wall (112d) and side walls (112b,c) defining an opening (114) through which the cable extends, another wall (112a) of the bracket (110) adjacent the pyrotechnic element including an integrally shaped pulley element (116) about which the cable extends.

2. The system as defined in claim 1 wherein the buckle does not include an anti-g buckle.

3. The system as defined in claim 1 wherein the system includes a shoulder belt.

4. The system as defined in claim 1 wherein the lap belt is connected to the buckle via a latchable tongue.

5. The system as defined in claim 1 wherein the pulley element (116) is formed as a tubular sector.

6. The system as defined in claim 1 wherein the end wall is connectable to a mounting member.

7. The system as defined in claim 1 wherein the pretensioning means is mountable proximate an outboard location within the vehicle.

8. The system as defined in claim 1 wherein the end of the lap belt includes a pocket and wherein the cable includes an end connected to a T-shaped connecting member received in the pocket of the lap belt.

9. The system as defined in claim 8 wherein the pocket is formed by two overlaying layers of lap belt material.

* * * * *